United States Patent
Fassbender et al.

(10) Patent No.: US 9,750,104 B2
(45) Date of Patent: *Aug. 29, 2017

(54) SYSTEMS, APPARATUS, AND METHODS FOR CONVERTING A BI-LEVEL LIGHTING SYSTEM TO A DIMMABLE LIGHTING SYSTEM

(71) Applicant: ABL IP HOLDING, LLC, Conyers, GA (US)

(72) Inventors: William J. Fassbender, Watertown, CT (US); Stephen H. Lydecker, Snellville, GA (US); Glen A. Kruse, Snellville, GA (US); Ryan A. Zaveruha, Stratford, CT (US); David M. Behnke, Higganum, CT (US)

(73) Assignee: ABL IP HOLDING, LLC, Conyers, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/167,962

(22) Filed: May 27, 2016

(65) Prior Publication Data

US 2016/0278179 A1    Sep. 22, 2016

Related U.S. Application Data

(63) Continuation of application No. 14/562,452, filed on Dec. 5, 2014, now Pat. No. 9,386,648.

(51) Int. Cl.
*H05B 33/08*    (2006.01)
*H05B 37/02*    (2006.01)
(Continued)

(52) U.S. Cl.
CPC ..... *H05B 33/0854* (2013.01); *H05B 33/0845* (2013.01); *H05B 33/0851* (2013.01);
(Continued)

(58) Field of Classification Search
CPC ............ H05B 33/0845; H05B 33/0854; H05B 33/0851; H05B 33/0869; H05B 37/0209;
(Continued)

(56) References Cited

U.S. PATENT DOCUMENTS

| 5,513,088 A | 4/1996 | Williamson |
| 5,646,490 A * | 7/1997 | Carson ............... H05B 37/0254 |
| | | 315/292 |

(Continued)

*Primary Examiner* — Jimmy Vu
*Assistant Examiner* — Henry Luong
(74) *Attorney, Agent, or Firm* — Dugan & Dugan, P.C.; Garry J. Tuma

(57) ABSTRACT

A dimmable lighting system may replace a bi-level lighting system without having to modify or supplement the existing wiring between a bi-level control unit and one or more light fixtures. The dimmable lighting system may include a dimming controller that may be configured to replace a bi-level control unit in situ (i.e., e.g., in a wall-mounted dual-gang switch box). The dimmable lighting system may also include a dimming driver that may be coupled to the dimming controller via the existing wiring of the bi-level lighting system. The dimming controller may output to the dimming driver a 0-10 volt DC dimming signal referenced to an AC utility voltage. In response, a dimmable lighting device coupled to the dimming driver may output light over a wide range of dimming light levels. Methods of replacing a bi-level lighting system with a dimmable lighting system are also provided, as are other aspects.

30 Claims, 5 Drawing Sheets

(51) Int. Cl.
    *H05B 41/39*     (2006.01)
    *H05B 39/08*     (2006.01)
    *H05B 41/36*     (2006.01)

(52) U.S. Cl.
    CPC ..... *H05B 37/0209* (2013.01); *H05B 37/0254* (2013.01); *H05B 39/086* (2013.01); *H05B 41/39* (2013.01); *H05B 41/36* (2013.01); *Y02B 20/40* (2013.01); *Y02B 20/46* (2013.01)

(58) Field of Classification Search
    CPC ... H05B 37/0254; H05B 39/086; Y02B 20/40
    USPC ....... 315/274–282, 247, 246, 224, 225, 291, 315/307–326, 185 S, 209 R, 300, 297
    See application file for complete search history.

(56) References Cited

U.S. PATENT DOCUMENTS

| | | |
|---|---|---|
| 5,793,593 A | 8/1998 | Reed |
| 2003/0043027 A1* | 3/2003 | Carson .................. H04B 3/54 |
| | | 375/259 |
| 2015/0001929 A1 | 1/2015 | Juntunen |
| 2015/0021988 A1 | 1/2015 | Barnetson |

\* cited by examiner

SYSTEMS, APPARATUS, AND METHODS FOR CONVERTING A BI-LEVEL LIGHTING SYSTEM TO A DIMMABLE LIGHTING SYSTEM

CROSS REFERENCE TO RELATED APPLICATION

This is a continuation of U.S. patent application Ser. No. 14/562,452, filed Dec. 5, 2014, now U.S. Pat. No. 9,386,648, which is hereby incorporated by reference herein in its entirety for all purposes.

FIELD

The invention relates generally to lighting systems and, more particularly, to converting an existing bi-level lighting system to a dimmable lighting system.

BACKGROUND

A bi-level lighting system (which may also be referred to as an A/B lighting system) may control lighting in an area, such as, e.g., a commercial, residential, or industrial space, and may typically provide two levels of partial lighting between an "all lights off" state and an "all lights on" state. For example, some known bi-level lighting systems may have a first partial lighting level that turns on 25% of the lighting in an area (e.g., one light bulb or fluorescent tube out of every four) and a second partial lighting level that turns on 75% of the lighting in that area (e.g., three light bulbs or fluorescent tubes out of every four). Such bi-level lighting systems may typically include a pair of switches located in, e.g., a wall-mounted dual-gang switch box. The pair of switches may be connected in the switch box to an AC utility power source. Associated wiring between the switch box and the lighting may include an "A load" conductor for connecting a first switch with every fourth light bulb or fluorescent tube, and a "B load" conductor for connecting a second switch with the remaining three light bulbs or fluorescent tubes of every four. To turn on 25% of the lighting, the first switch may be activated, which connects power to 25% of the lighting, while the second switch is deactivated, which disconnects power from the remaining 75% of the lighting. To turn on 75% of the lighting, the second switch may be activated, which connects power to 75% of the lighting, while the first switch is deactivated, which disconnects power from the remaining 25% of the lighting. To turn on all the lighting, both switches may be activated, which connects power to all of the lighting. And to turn off all the lighting, both switches may be deactivated, which disconnects power from all of the lighting. Energy savings with bi-level lighting systems, however, are limited because they provide only two levels of partial lighting.

A dimmable lighting system may allow dimmable lighting to be dimmed to any light level between 100% (all lights fully powered) and, e.g., 15%, 10%, or 0% (all lights off). Such dimmable lighting systems, therefore, provide a greater range of dimming and, thus, a greater opportunity for energy savings while still providing a desired or acceptable level of lighting during, e.g., periods of available daylight and/or non-occupancy. However, replacing an existing bi-level lighting system with a dimmable lighting system may require expensive and time consuming removal and/or replacement of existing wiring through largely inaccessible spaces, such as, e.g., inside walls and ceilings, in order to connect a dimming light controller, which may replace the bi-level switches in a switch box, to one or more dimmable lighting devices.

Accordingly, a need exists to provide systems, apparatus, and methods for replacing existing bi-level lighting controls and light fixtures with dimmable lighting controls and dimmable lighting devices without having to modify and/or replace the existing wiring of the bi-level lighting system.

SUMMARY

According to one aspect, a dimming controller is provided. The dimming controller comprises a voltage input connectable to a Class 1 power conductor configured to provide an AC voltage, a ground input connectable to a ground conductor, a first output connectable to a first Class 1 conductor, a second output connectable to a second Class 1 conductor, a switching device coupled between the voltage input and the second output, and a dimming signal generator having a voltage reference coupled to the second output and having a dimming signal output coupled to the first output. The dimming signal generator is operative to provide a dimming signal indicative of a dimming light level at the dimming signal output, and the dimming signal is referenced to an AC voltage received at the voltage input.

According to another aspect, a dimming driver operative to power a dimmable lighting device is provided. The dimming driver comprises a voltage input connectable to a Class 1 power conductor, a neutral input connectable to a neutral conductor, a ground input connectable to a ground conductor, a first input connectable to a first Class 1 conductor, and a second input connectable to a second Class 1 conductor. The second input is coupled to the voltage input. The dimming driver also comprises a dimming signal receiver coupled to the first input and to the second input and having an output. The dimming signal receiver is operative to receive a dimming signal referenced to an AC voltage and operative to provide at the output a dimming control signal indicative of a dimming light level. The dimming driver further comprises a lighting controller having an input coupled to the dimming signal receiver output, wherein the lighting controller is operative to provide power indicative of the dimming light level to a dimmable lighting device.

According to a further aspect, a method of replacing a bi-level lighting system with a dimmable lighting system is provided. The method comprises installing a dimming controller in a switch box, the dimming controller having a voltage input, a first output, and a second output, wherein the dimming controller is operative to output a 0-10 volt DC dimming signal indicative of a dimming light level, and the dimming signal is referenced to an AC voltage received at the voltage input. The method also comprises connecting the dimming controller to only Class 1 conductors received in the switch box.

According to a still further aspect, another method of replacing a bi-level lighting system with a dimmable lighting system is provided. This method comprises installing a dimming driver at a light fixture location, the dimming driver having a voltage input, a first input, and a second input coupled to the voltage input, wherein the dimming driver is operative to receive a 0-10 volt DC dimming signal indicative of a dimming light level, and the dimming signal is referenced to an AC voltage. The dimming driver is also operative to provide power indicative of the dimming light level to a dimmable lighting device. This method also comprises connecting the dimming driver to only Class 1 conductors received at the light fixture location.

Still other aspects, features, and advantages of the invention may be readily apparent from the following detailed description wherein a number of example embodiments and implementations are described and illustrated, including the best mode contemplated for carrying out the invention. The invention may also include other and different embodiments, and its several details may be modified in various respects, all without departing from the scope of the invention. Accordingly, the drawings and descriptions are to be regarded as illustrative in nature, and not as restrictive. The invention covers all modifications, equivalents, and alternatives of the aspects disclosed herein.

BRIEF DESCRIPTION OF DRAWINGS

Persons skilled in the art will understand that the drawings, described below, are for illustrative purposes only. The drawings are not necessarily drawn to scale and are not intended to limit the scope of this disclosure in any way.

DETAILED DESCRIPTION

Reference will now be made in detail to the example embodiments of this disclosure, which are illustrated in the accompanying drawings. Wherever possible, the same reference numbers will be used throughout the drawings to refer to the same or like parts.

A bi-level lighting system may typically be wired with "Class 1" conductors connecting a bi-level control unit to one or more light fixtures. "Class 1" refers to the National Electric Code (NEC) standard for safely installing electrical wiring and equipment in high voltage applications. For example, Class 1 circuits and wiring may be used in applications where voltages range from about 120 volts to about 277 volts AC, and in other applications, up to 600 volts. A Class 1 conductor may have a wire gauge (i.e., diameter) of, e.g., 14 AWG (American Wire Gauge). The Class 1 conductors in a bi-level lighting system typically provide AC utility power from the bi-level control unit to the one or more light fixtures.

A dimmable lighting system is typically a low voltage system wired with "Class 2" conductors connecting a dimming controller to a dimming driver, which drives a dimmable lighting device. "Class 2" refers to the NEC's standard for safely installing electrical wiring and equipment in low voltage applications. Low voltage applications may include voltages ranging up to, e.g., about 42 volts DC. A Class 2 conductor may have a wire gauge of, e.g., 30-24 AWG (note that as the diameter decreases, the AWG increases). Thus, Class 2 wiring may be thinner and easier to work with than Class 1 wiring, among other differences. The Class 2 conductors in a dimmable lighting system typically provide low voltage DC power and dimming signals from a dimming controller to a dimming driver.

In one aspect, a bi-level lighting system may be replaced with a dimmable lighting system without having to replace, remove, or modify the existing wiring, which may comprise Class 1 conductors that connect a bi-level control unit to one or more light fixtures. A dimming controller may be configured to replace a bi-level control unit in situ (e.g., in a wall-mounted switch box) and connect to the existing Class 1 conductors previously connected to the bi-level control unit. The dimming controller may output via one of the Class 1 conductors a dimming signal referenced to an AC voltage instead of a typical zero volt reference. The AC voltage may be an AC utility voltage received by the bi-level control unit via a Class 1 power conductor. A dimming driver at a light fixture location may be configured to receive the dimming signal referenced to the AC voltage and, in response, drive a dimmable lighting device to a dimming light level indicated by the dimming signal. In other aspects, methods of replacing a bi-level lighting system with a dimmable lighting system are provided, as will be explained in greater detail below in connection with FIGS. 1-6.

Figure 1:
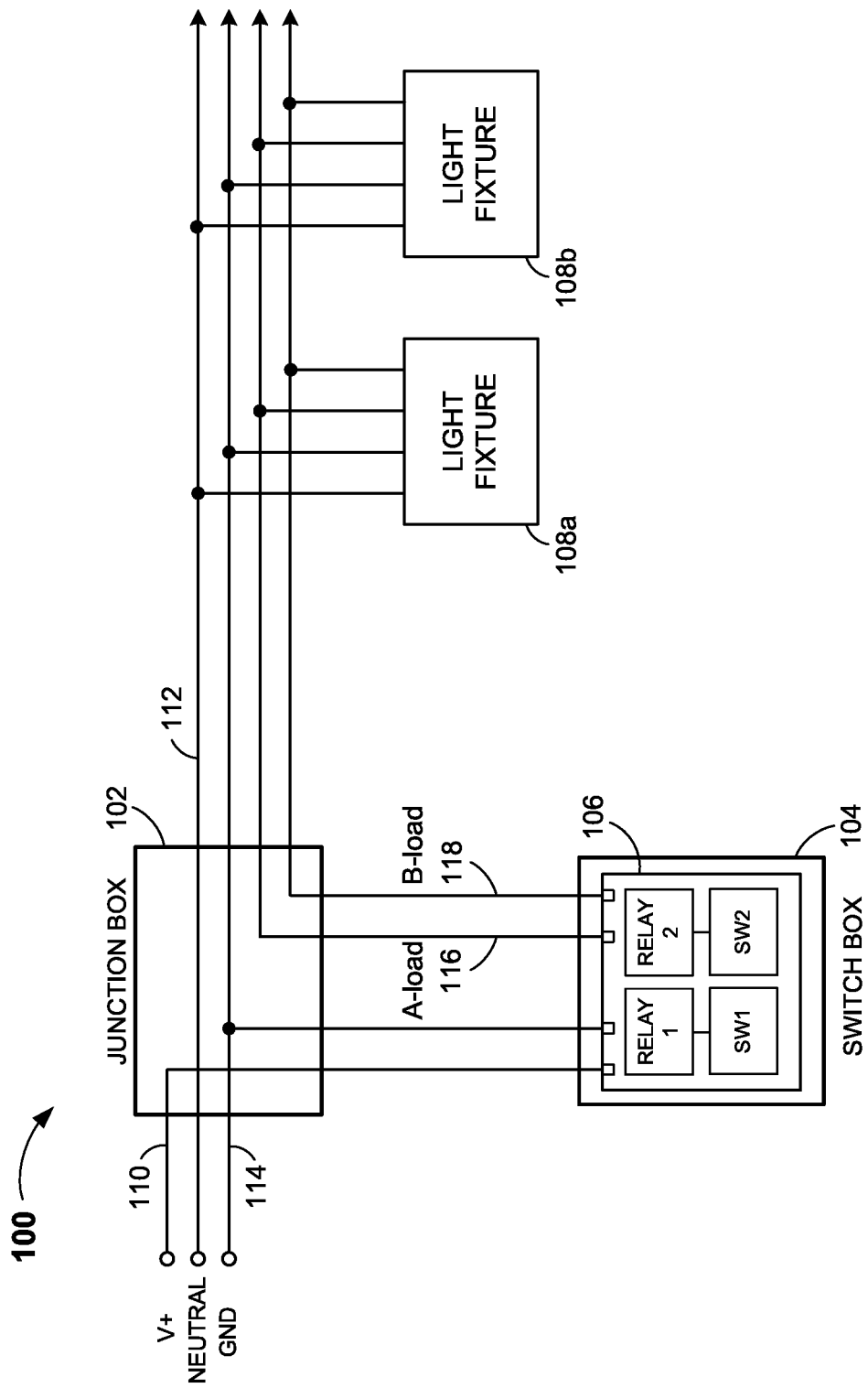
FIG. 1 illustrates a schematic block diagram of a bi-level lighting system according to the prior art.

FIG. 1 illustrates a bi-level lighting system 100 in accordance with the prior art. Bi-level lighting system 100 may include a junction box 102, a switch box 104, a bi-level control unit 106, and one or more light fixtures 108*a* and 108*b*. Junction box 102 may be a metal or plastic container for enclosing electrical connections and may be mounted and/or concealed in a ceiling, under a floor, or behind an access panel. Switch box 104 may be a wall-mounted metal or plastic container configured to enclose, e.g., a light switch, an electrical outlet, or an occupancy sensor, and electrical connections thereto. In particular, switch box 104 may be, e.g., a wall-mounted dual-gang switch box. A dual-gang switch box may be configured to house, e.g., two standard light switches. Bi-level control unit 106 may be received in switch box 104 and may include a pair of switches SW1 and SW2 and a pair of relays, Relay 1 and Relay 2. Switch SW1 may be coupled to Relay 1, and switch SW2 may be coupled to Relay 2.

AC utility power, which typically may range from 120 volts to 277 volts for a bi-level lighting system, may be received in junction box 102 via a power conductor 110 (labeled V+), a neutral conductor 112, and a ground conductor 114. Ground conductor 114 may be connected to an earth ground. Power conductor 110 and ground conductor 114 may be received in switch box 104 from junction box 102 and may be connected to bi-level control unit 106. In particular, power conductor 110 may be connected to both Relay 1 and Relay 2. Relay 1 may also be connected to an A-load conductor 116 received in switch box 104, and Relay 2 may also be connected to a B-load conductor 118 received in switch box 104 (these internal connections are not shown in FIG. 1). Power conductor 110, neutral conductor 112, ground conductor 114, A-load conductor 116, and B-load conductor 118 may each be a Class 1 conductor.

Each light fixture 108*a* and 108*b* may receive and be connected to neutral conductor 112, ground conductor 114, A-load conductor 116, and B-load conductor 118. Each light fixture 108*a* and 108*b* may include several light bulbs or fluorescent tubes. A-load conductor 116 may provide AC power and be connected to only a first group (e.g., 25%) of the light bulbs or fluorescent tubes of each light fixture 108*a* and 108*b*. Conversely, B-load conductor 118 may provide AC power and be connected to only a second, remaining group (e.g., 75%) of the light bulbs or fluorescent tubes of each light fixture 108a and 108b.

Bi-level lighting system 100 may operate as follows: To turn on all the lighting of light fixtures 108a and 108b, a user may activate both switch SW1 and switch SW2. Activation of switch SW1 may cause Relay 1 to connect AC power received from power conductor 110 to A-load conductor 116, and activation of switch SW2 may cause Relay 2 to connect AC power received from power conductor 110 to B-load conductor 118. Each activation of switch SW1 and SW2 may result in A-load conductor 116 and B-load conductor 118 respectively conducting an AC voltage of 120 volts to 277 volts. The first and second groups of light bulbs or fluorescent tubes (i.e., all the light bulbs or fluorescent tubes) of each light fixture 108a and 108b may now receive power and turn on.

To activate only the first group of light bulbs or fluorescent tubes of each light fixture 108a and 108b and thus provide a first level of partial lighting, switch SW1 may be activated while switch SW2 is deactivated. Deactivation of switch SW2 may cause Relay 2 to disconnect power from B-load conductor 118, which in turn may disconnect power from the second group of light bulbs or fluorescent tubes of each light fixture 108a and 108b, causing them to turn off. As described above, activation of switch SW1 may connect power to A-load conductor 116, which provides power to the first group of light bulbs or fluorescent tubes of each light fixture 108a and 108b, causing them to turn on.

Conversely, to activate only the second group of light bulbs or fluorescent tubes of each light fixture 108a and 108b, and thus provide a second level of partial lighting, switch SW2 may be activated while switch SW1 is deactivated. Deactivation of switch SW1 may cause Relay 1 to disconnect power from A-load conductor 116, which in turn may disconnect power from the first group of light bulbs or fluorescent tubes of each light fixture 108a and 108b, causing them to turn off. As described above, activation of switch SW2 may connect power to B-load conductor 118, which may provide power to the second group of light bulbs or fluorescent tubes of each light fixture 108a and 108b, causing them to turn on.

To turn off all the lighting of light fixtures 108a and 108b, a user may deactivate both switch SW1 and switch SW2 which, as described above, disconnects power from both the first and second groups of light bulbs or fluorescent tubes of each light fixture 108a and 108b, causing them to turn off.

As mentioned above, energy savings with a bi-level lighting system may be limited to the two partial levels of lighting provided thereby. A dimmable lighting system may have a greater range of dimming light levels and, thus, greater opportunities for saving energy when less than full lighting is required.

Figure 2:
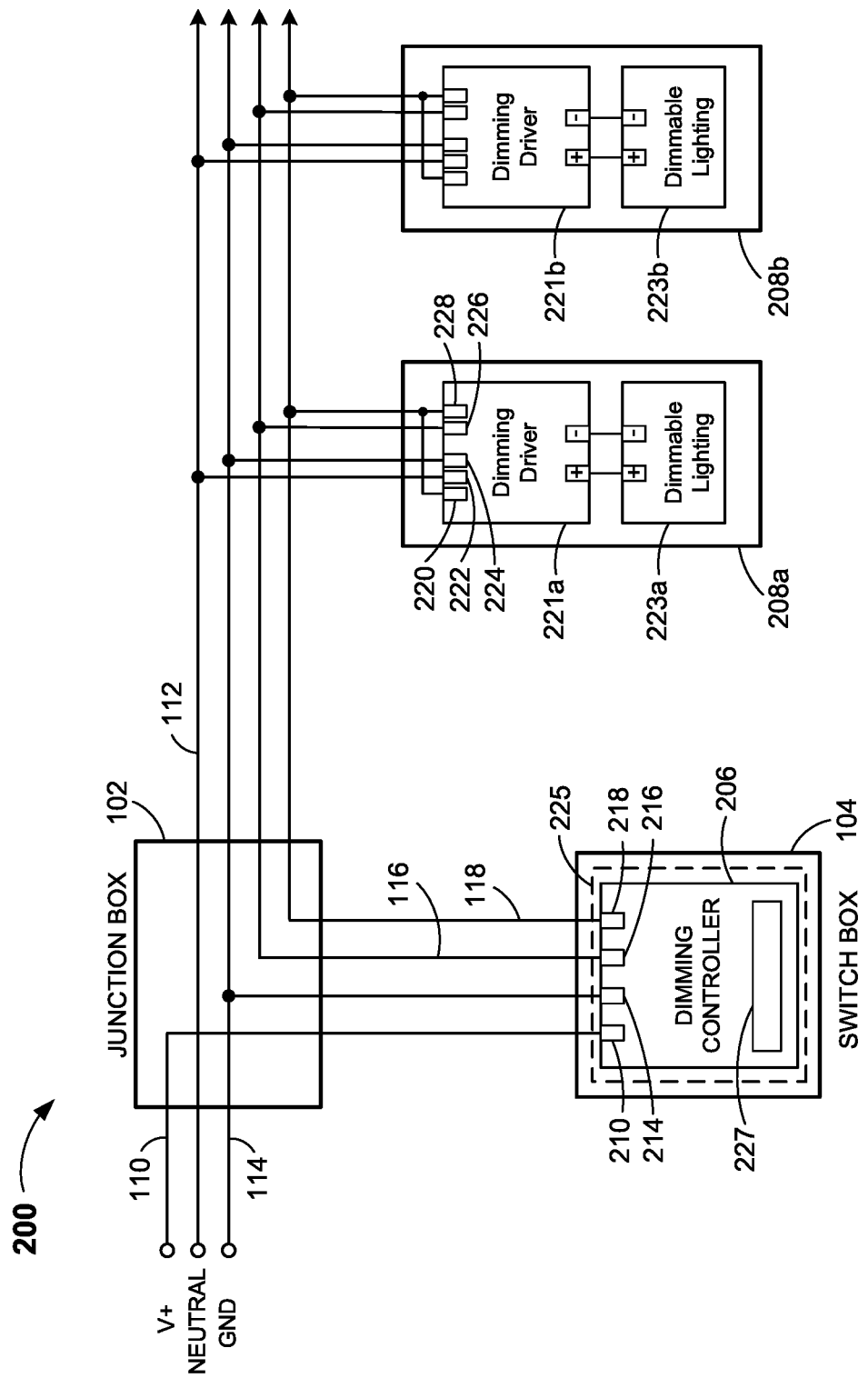
FIG. 2 illustrates a schematic block diagram of a dimmable lighting system that may replace a bi-level lighting system according to embodiments.

FIG. 2 illustrates a dimmable lighting system 200 in accordance with one or more embodiments. In some embodiments, dimmable lighting system 200 may replace bi-level lighting system 100 and/or a similar system without having to replace, remove, supplement, and/or modify any of the existing wiring between bi-level control unit 106 and light fixtures 108a and 108b. That is, none of the existing conductors, including power conductor 110, neutral conductor 112, ground conductor 114, A-load conductor 116, and B-load conductor 118 may need to be replaced, removed, supplemented, and/or modified.

Dimmable lighting system 200 may, in some embodiments, function as a Class 2 system to control dimming via 0-10 volt DC dimming control signals. That is, the dimming signals that control the lighting output of a dimmable lighting device may be scaled such that a 10 volt dimming signal may result in 100% light output (i.e., lighting fully on), a zero volt dimming signal may result in 0% light output (i.e., lighting off), and dimming signals between zero and 10 volts may result in various intermediate light output levels. Note that in some embodiments, depending on the type of dimmable lighting (and associated ballasts) used, the dimming range may not go down to zero (i.e., lighting off), but may go down to only, e.g., 20%, 15%, or 10% light output, requiring a separate action (e.g., activation of a switch) to turn off the lighting completely. Thus, in some embodiments, dimmable lighting system 200 may provide a dimming range of less than 0% to 100%, such as, e.g., 20% to 100%, 15% to 100%, 10% to 100%, etc. Other embodiments may provide other dimming ranges.

Dimmable lighting system 200 may include a dimming controller 206 and one or more dimming drivers 221a and 221b located at respective light fixture locations 208a and 208b. Dimmable lighting system 200 may also include dimmable lighting devices 223a and 223b also located at respective light fixture locations 208a and 208b. Light fixture locations 208a and 208b may be the same locations at which light fixtures 108a and 108b of bi-level lighting system 100 were located. Dimmable lighting devices 223a and 223b may each be LED (light emitting diode) lighting devices. In other embodiments, dimmable lighting devices 223a and 223b may each be any suitable type of dimmable lighting device, such as, e.g., CFLs (compact fluorescent lights) and/or any suitable combination of different types of dimmable lighting devices. Each pair of dimming driver and dimmable lighting device (e.g., dimming driver 221a and dimmable lighting device 223a) may be integrated as a single device, assembled from discrete components into a single light fixture, or coupled together as separate parts at a light fixture location. In other embodiments, dimming drivers 221a and 221b may be located remotely from respective dimmable lighting devices 223a and 223b.

Dimming controller 206 may be configured to be received in switch box 104, which may be, e.g., a wall-mounted dual-gang switch box. In some embodiments, dimming controller 206 may be an integral or discrete part of an occupancy sensor, light sensor, motion sensor, sound sensor, and/or like device 225 (shown in phantom) that may also be configured to be received in switch box 104.

Dimming controller 206 may include a user interface 227 that, in some embodiments, may allow a user to, e.g., turn dimmable lighting devices 223a and 223b on or off, set a dimmable light level, and/or program dimming controller 206 to set dimmable light levels in accordance with one or more criteria, such as, e.g., time of day, occupancy, ambient light level, etc.

Dimming controller 206 may include a voltage input 210, a ground input 214, a first output 216, and a second output 218. Voltage input 210 may be connectable to a Class 1 power conductor configured to provide an AC voltage. Ground input 214 may be connectable to a ground conductor, which may be coupled to earth ground. Additionally or alternatively, ground input 214 may be connectable to a neutral conductor if available. First output 216 may be connectable to a first Class 1 conductor, and second output 218 may be connectable to a second Class 1 conductor. As shown in FIG. 2, upon installation of dimming controller 206 in switch box 104, voltage input 210 may be connected to power conductor 110, ground input 214 may be connected to ground conductor 114, first output 216 may be connected to A-load conductor 116, and second output 218 may be connected to B-load conductor 118, wherein each of power conductor 110, ground conductor 114, A-load conductor 116, and B-load conductor 118 may be received in switch box 104. As described above, power conductor 110, ground conductor 114, A-load conductor 116, and B-load conductor 118 may each be a Class 1 conductor.

Dimming drivers 221a and 221b may each include a voltage input 220, a neutral input 222, a ground input 224, a first input 226, and a second input 228 (for clarity, only the inputs of dimming driver 221a are labeled). Voltage input 220 may be connectable to a Class 1 power conductor. Neutral input 222 may be connectable to a neutral conductor. Ground input 224 may be connectable to a ground conductor, which may be coupled to earth ground. First input 226 may be connectable to a first Class 1 conductor, and second input 228 may be connectable to a second Class 1 conductor. As shown in FIG. 2, upon installation of dimming driver 221a and/or 221b at, e.g., light fixture location 208a and/or 208b, neutral input 222 may be connected to neutral conductor 112, ground input 224 may be connected to ground conductor 114, first input 226 may be connected to A-load conductor 116, and second input 228 may be connected to B-load conductor 118. Also, voltage input 220 may be electrically coupled to second input 228. In some embodiments, voltage input 220 may be coupled to second input 228 prior to installation of dimming driver 221a or 221b at light fixture location 208a or 208b. Dimming drivers 221a and/or 221b may also be, in some embodiments, connectable to other types of conductors, such as, e.g., Class 2 conductors.

Dimmable lighting system 200 may thus be installed in place of bi-level lighting system 100 without having to replace, remove, supplement, and/or modify any existing power conductor 110, neutral conductor 112, ground conductor 114, A-load conductor 116, and/or B-load conductor 118 received at switch box 104 and/or the one or more light fixtures 108a and 108b, and/or any existing wiring connection in junction box 102, that were used to power bi-level control unit 106 and to connect bi-level control unit 106 to the one or more light fixtures 108a and 108b. Accordingly, the installation of dimmable lighting system 200 may be greatly simplified and the associated costs reduced.

Figure 3:
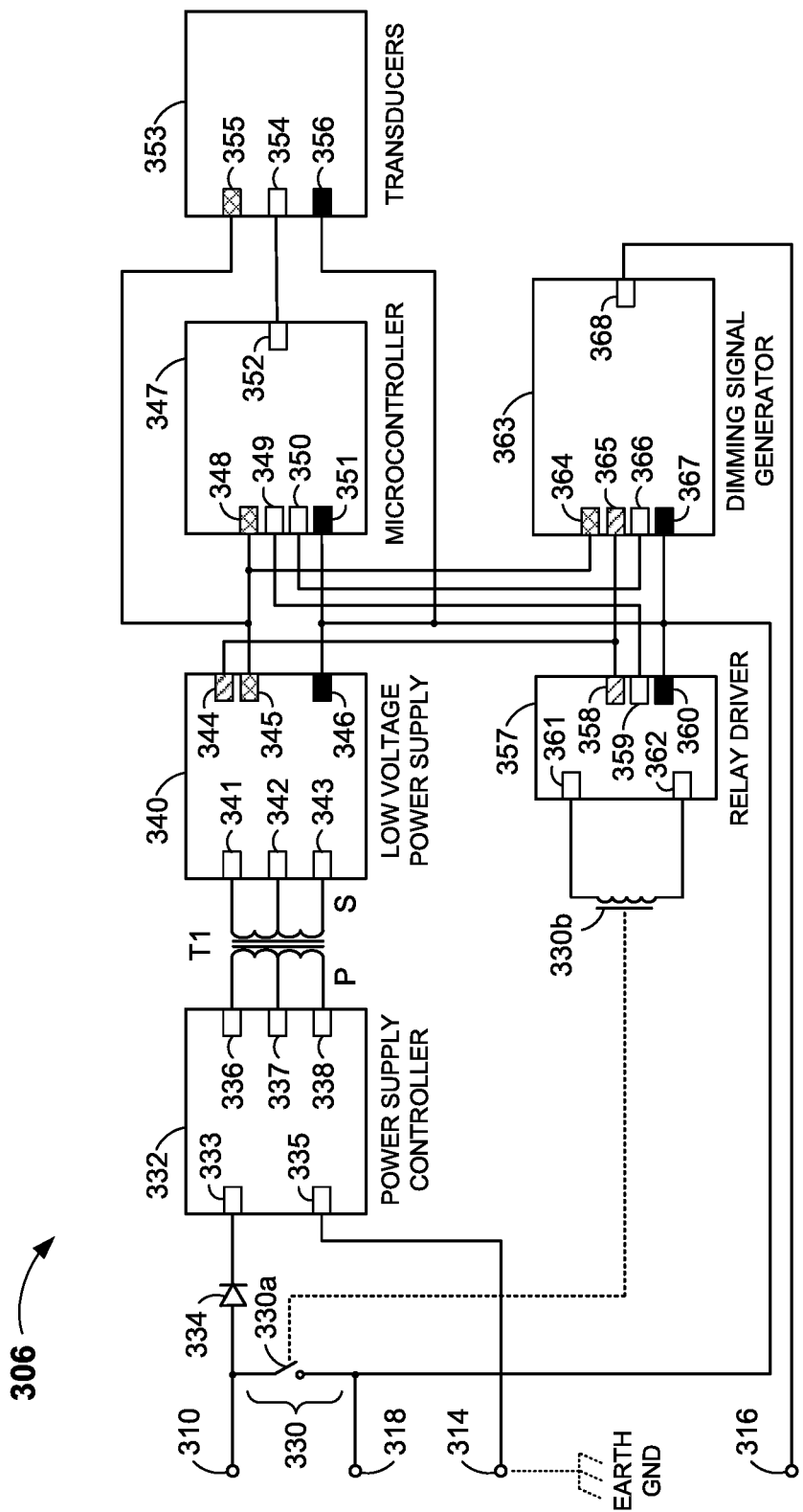
FIG. 3 illustrates a schematic block diagram of a dimming controller that may be used in the dimmable lighting system of FIG. 2 according to embodiments.

FIG. 3 illustrates a dimming controller 306 that may be used in dimmable lighting system 200 in accordance with one or more embodiments. Dimming controller 306 may be configured to be received in switch box 104, which in some embodiments is a wall-mounted dual-gang switch box. In some embodiments, dimming controller 306 may be an integral or discrete part of an occupancy sensor, light sensor, motion sensor, sound sensor, and/or like device that may also be configured to be received in switch box 104. Dimming controller 306 may be configured to control an on/off light function, a dimming light function and, in some embodiments, one or more functions related to any one or more of the aforementioned sensors and/or like devices.

Dimming controller 306 may include a voltage input 310, a ground input 314, a first output 316, and a second output 318. Voltage input 310 may be connectable to a Class 1 power conductor configured to provide an AC voltage. The AC voltage may range from about 120 volts to about 277 volts in some embodiments and, in other embodiments, may range up to about 347 volts. Ground input 314 may be connectable to a ground conductor, which may be an earth ground conductor (shown in phantom). In some embodiments, ground input 314 may alternatively be connectable to a neutral conductor if available. First output 316 may be connectable to a first Class 1 conductor, and second output 318 may be connectable to a second Class 1 conductor. For example, referring to FIG. 2, voltage input 310 may be connected to power conductor 110, ground input 314 may be connected to ground conductor 114, first output 316 may be connected to A-load conductor 116, and second output 318 may be connected to B-load conductor 118.

A switching device 330 may be coupled between voltage input 310 and second output 318 to electrically couple and decouple voltage input 310 to and from second output 318. In some embodiments, switching device 330 may be an electronic relay comprising contacts 330a and a relay coil 330b. Switching device 330 may be an electronic relay, such as, e.g., an RT33L12 by Tyco Electronics Corporation, of Berwyn, Pa. Other suitable electronic relays or other suitable types of switching devices may be used as switching device 330.

Dimming controller 306 may also include a power supply controller 332, a transformer T1, a low voltage power supply 340, a microcontroller 347, transducers 353, a relay driver 357, and a dimming signal generator 363. Power supply controller 332 may have a line voltage input 333 that may be coupled to voltage input 310 via a diode 334. Diode 334 may be, e.g., an S1M_SMA type diode available from, e.g., Fairchild Semiconductor Corporation, of San Jose, Calif.

Power supply controller 332 may also have a ground input 335 that may be coupled to ground input 314. Power supply controller 332 may further have a PUSH output 336, a DC output 337, and a PULL output 338 that may each be coupled to a primary winding P of a high frequency ferrite core transformer T1 having a center tap, as shown in FIG. 3. Power supply controller 332 may rectify and filter the AC line voltage (which may be, e.g., about 120 volts, about 277 volts, or about 347 volts RMS) to about 12 to 15 volts DC and apply that voltage to DC output 337, which may be coupled to the center tap of transformer T1. PUSH output 336 and PULL output 338 may alternately be connected to the circuit reference (e.g., ground), such that only half of the primary winding of transformer T1 is energized at any one time (thus, the PUSH/PULL nomenclature). This may produce an AC square wave first on the upper half of the primary winding P and then alternately on the lower half of the primary winding P. The frequency of the primary alternate operation may range from about 50 kHz to 100 kHz and the control signals may be generated by any suitable dedicated microcontroller (not shown). This may result in generated AC square waves on the secondary winding S of transformer T1, which may be substantially identical to the AC square waves at the primary winding P of transformer T1 that can be used to generate an isolated low voltage power supply. Alternatively, a resonant power converter may be used instead of a push-pull type power converter. Any suitable power supply controller may be used.

Transformer T1 may also electrically isolate voltage input 310 and power supply controller 332 from the other components of dimming controller 306 (i.e., low voltage power supply 340, microcontroller 347, transducers 353, relay driver 357, and dimming signal generator 363). In other words, transformer T1 may prevent leakage current from finding a conduction path to earth ground. When relay contacts 330a are closed, the AC line voltage applied at voltage input 310 is electrically connected to the secondary circuit reference (i.e., voltage references 346, 351, 356, 360, and 367). This may ensure compliance with one or more UL Standards, such as, e.g., UL 773. Because a neutral line is typically not available in a wall switch box, dimming controller 306 may derive power through earth ground. In some embodiments, earth ground current may be limited to 500 uA in accordance with one or more applicable UL standards, so any unexpected additional earth ground current may cause non-compliance. Also, transformer T1 may be used because this topology allows the secondary to float on AC line voltage received at second output 318 when relay contacts 330a are closed. This may eliminate the need for an extra conductor and accordingly allow dimmable lighting system 200 to operate with only the existing A-load conductor 116 and B-load conductor 118 of bi-level lighting system 100.

Low voltage power supply 340 may convert a received AC voltage to first and second regulated low DC voltages (e.g., about 3.3 volts and about 12 volts) that may be provided to one or more of microcontroller 347, transducers 353, relay driver 357, and/or dimming signal generator 363. Low voltage power supply 340 may have a PUSH input 341, a power reference input 342, and a PULL input 343 that may each be coupled to a secondary winding S of transformer T1 as shown in FIG. 3. Low voltage power supply 340 may also have a 12-volt DC output 344, a 3.3-volt DC output 345, and a voltage reference 346. Voltage reference 346 may be coupled to voltage input 310 via switching device 330. When switching device 330 is open, voltage input 310 may not be electrically coupled to second output 318 and the "secondary side" (i.e., low voltage power supply 340, microcontroller 347, relay driver 357, and dimming signal generator 363) may be galvanically isolated from power supply controller 332. That is, the "secondary circuit reference," comprising voltage references 346, 351, 356, 360, and 367, may be isolated and low voltage (conforming to, e.g., Class 2). Galvanic isolation may refer to electrical circuits that have no direct conduction or current path there between, yet can still electrically communicate with each other. Such "isolated" electrical circuits may have reference voltages (commonly zero volts or ground) that are different from each other. For example, one circuit may have a reference voltage of ground while another may have a positive or negative reference voltage. When switching device 330 is closed, voltage input 310 may be electrically coupled to second output 318 and the secondary circuit reference may be the AC line voltage received at voltage input 310. Low voltage power supply 340 may be, e.g., a TL431 or LP2985 power supply by Texas Instruments Incorporated, of Dallas, Tex. Any suitable low voltage power supply may be used.

Microcontroller 347 may be a programmable processing device that may include a processor and a memory, and may provide dimming controller 332 with automatic dimming control and on/off functionality of associated lighting coupled to dimming controller 306. That is, microcontroller 347 may be programmable by a user and may have stored and/or programmable instructions for determining, e.g., when to turn associated lighting on or off and/or when and at what dimming light level to set the associated lighting. Microcontroller 347 may be operative to receive signals from, e.g., an occupancy sensor, a light sensor, or a user interface. Microcontroller 347 may be coupled to dimming signal generator 363 and may be operative to control the operation of dimming signal generator 363 in response to receiving those signals and/or executing stored and/or programmable instructions. For example, microcontroller 347 may be operative to cause dimming signal generator 363 to output a dimming signal indicative of a predetermined dimming light level based on, e.g., a signal representing occupancy or an ambient light level. Microcontroller 347 may include a 3.3-volt DC input 348, a relay control output 349, a dimming control output 350, a voltage reference 351, and a transducer input 352. The 3.3-volt DC input 348 may be coupled to the 3.3-volt DC output 345 of low voltage power supply 340, and voltage reference 351 may be coupled to voltage input 310 via switching device 330. Microcontroller 347 may be, e.g., an MSP430 series family microcontroller from Texas Instruments Incorporated, of Dallas, Tex. Any suitable microcontroller may be used.

Transducers 353 may convert various received inputs into electrical signals that may then be provided at an output 354 to transducer input 352 of microcontroller 347. The various received inputs may include, e.g., any one or more of manual switch activations (such as, e.g., to turn lighting on or off) and/or user interface inputs (such as, e.g., activations of various soft keys, keys on a keypad, and/or buttons to, e.g., turn lighting on or off and/or control and/or set dimming light levels). The various received inputs may also include, e.g., one or more sensor inputs such as, e.g., passive infrared and/or microphonic signals from an occupancy sensor and/or optical signals from a light sensor. Although shown as a discrete entity, transducers 353 may represent one or more integrated circuits or components of a user interface and/or one or more sensors (not shown in FIG. 3) associated with or comprising dimming controller 306. Transducers 353 may also include a 3.3-volt DC input 355 and a voltage reference 356. The 3.3-volt DC input 355 may be coupled to the 3.3-volt DC output 345 of low voltage power supply 340, and voltage reference 356 may be coupled to voltage input 310 via switching device 330.

Relay driver 357 may include a 12-volt DC input 358, a relay control input 359, a voltage reference 360, a relay coil A output 361 and a relay coil B output 362. The 12-volt DC input 358 may be coupled to the 12-volt DC output 344 of low voltage power supply 340, and voltage reference 360 may be coupled to voltage input 310 via switching device 330. Relay coil A output 361 and relay coil B output 362 may be coupled to relay coil 330b. Relay control input 359 may be coupled to relay control output 349 of microcontroller 347. Relay driver 357 may be operative to cause switching device 330 to electrically couple voltage input 310 to second output 318 in response to a signal received from microcontroller 347. That is, upon receipt of a relay activation signal at relay control input 359 from relay control output 349 of microcontroller 347, relay driver 357 may energize coil 330b causing contacts 330a to close. This may electrically couple voltage input 310 to second output 318, which may provide AC power received at voltage input 310 to associated lighting via, e.g., B-load conductor 118. This may also provide an AC voltage received at voltage input 310 to voltage references 346, 351, 356, 360, and 367, the result of which is described below in connection with dimming signal generator 363.

The relay activation signal from microcontroller 347 may have resulted in response to an occurrence of a manual lighting switch activation signal received at transducer input 352 of microcontroller 347, a pre-programmed event, such as, e.g., a particular time of day, or a sensor signal (indicating, e.g., occupancy or a low ambient light level) received at transducer input 352 of microcontroller 347. Similarly, a relay deactivation signal may be received at relay control input 359 from relay control output 349 of microcontroller 347. A deactivation signal may de-energize coil 330b, causing contacts 330a to open. This may disconnect AC power to associated lighting via, e.g., B-load conductor 118, causing associated lighting to turn off (i.e., 0% light output). Relay driver 357 may be a discrete design using transistors and resistors as is known in the art. Any suitable relay driver may be used.

Dimming signal generator 363 may include a 3.3-volt DC input 364, a 12-volt DC input 365, a dimming control input 366, a voltage reference 367, and a dimming signal output 368. The 3.3-volt DC input 364 may be coupled to the 3.3-volt DC output 345 of low voltage power supply 340, and the 12-volt DC input 365 may be coupled to the 12-volt DC output 344 of low voltage power supply 340. Voltage reference 367 may be coupled to voltage input 310 via switching device 330. Dimming control input 366 may be coupled to dimming control output 350 of microcontroller 347, and dimming signal output 368 may be coupled to first output 316.

Dimming control input 366 may receive dimming control signals from microcontroller 347. The dimming control signals may indicate a dimming light level (e.g., from a 0% light level to a 100% light level in some embodiments) based on, e.g., signals received by microcontroller 347 via transducers 353 from one or more sensors and/or a user interface, such as, e.g., user interface 227 of FIG. 1. Thus, e.g., a user interface may be coupled (indirectly) to dimming signal generator 363 and may be operative to receive inputs indicating a desired on/off state of lighting, a dimming light level, or both. This may result in a dimming signal indicative of that on/off state and/or dimming light level to be output from dimming signal output 368 and first output 316.

Dimming signal generator 363 may be operative to provide a dimming signal indicative of a dimming light level at dimming signal output 368. In some embodiments, dimming signal generator 363 may employ 0-10 volt DC dimming control signaling to control the dimming light level of associated dimmable lighting, as described above in connection with dimming controller 206. However, in order to use only the existing A-load conductor 116 and B-load conductor 118 typically available at switch box 104 after removal of bi-level control unit 106, without having to install one or more additional signaling conductors to carry the 0-10 volt DC dimming signals, the dimming signal may be referenced to an AC voltage received at voltage input 310. That is, upon the closing of switching device 330 to electrically couple voltage input 310 to second output 318, an AC voltage received at voltage input 310 may be provided to voltage references 346, 351, 356, 360, and 367 instead of, e.g., a zero voltage or ground reference. Dimming signals provided at dimming signal output 368 may therefore be referenced to, or floating on, an AC voltage received at voltage input 310, which may also concurrently provide power to an associated dimming driver and dimmable lighting devices. Thus, additional wiring may not be needed when installing dimming controller 306. Dimming signal generator 363 may be, e.g., constructed discretely using op-amps, transistors, resistors, and capacitors as is known in the art. Any suitable dimming signal generator may be used.

Figure 4:
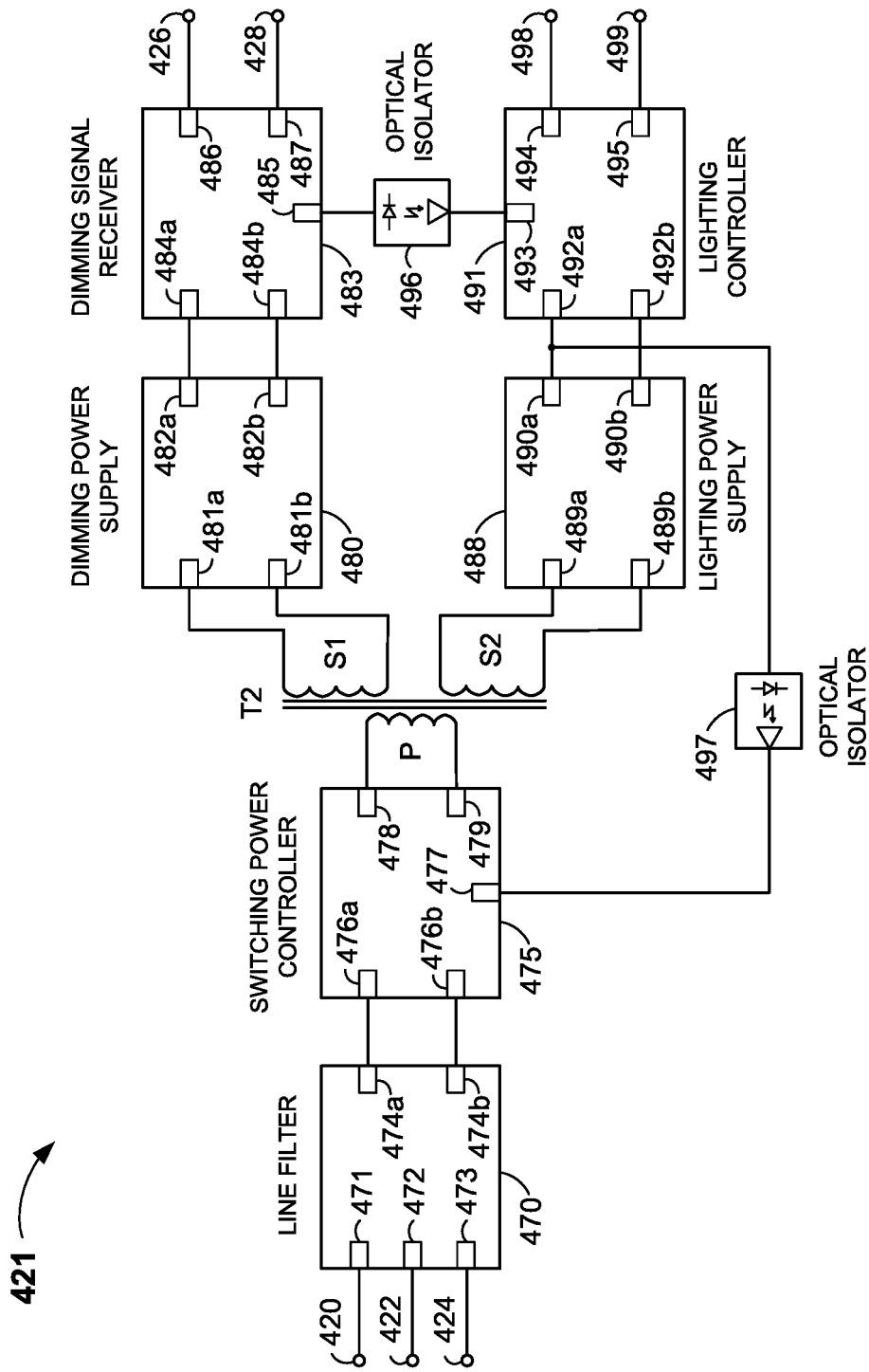
FIG. 4 illustrates a schematic block diagram of a dimming driver that may be used in the dimmable lighting system of FIG. 2 according to embodiments.

FIG. 4 illustrates a dimming driver 421 that may be used in dimmable lighting system 200 in accordance with one or more embodiments. Dimming driver 421 may be operative to drive a dimmable lighting device and may be located at a light fixture location that may have been used by a light fixture of a bi-level lighting system, such as, e.g., light fixture 108a or 108b of bi-level lighting system 100. Dimming driver 421 may alternatively be located at any suitable location. In some embodiments, dimming driver 421 and a dimmable lighting device may be integrated into a single device. In other embodiments, dimming driver 421 and a dimmable lighting device may be assembled from discrete components into a single light fixture or, alternatively, each may be installed at a light fixture location and coupled to each other as separate parts. In still other embodiments, dimming driver 421 may be located remotely from a dimmable lighting device. The dimmable lighting device may be, e.g., dimmable lighting device 223a or 223b of FIG. 2 and, in some embodiments, may be a bank of LEDs, CFLs, or other suitable type or suitable combinations of dimmable lighting devices.

Dimming driver 421 may include a voltage input 420, a neutral input 422, a ground input 424, a first input 426, a second input 428, a lighting device voltage+ output 498, and a lighting device voltage− output 499. Lighting device voltage+ output 498 and lighting device voltage− output 499 may be coupled to a dimmable lighting device (not shown in FIG. 4), such as, e.g., dimmable lighting device 223a or 223b of FIG. 2. Voltage input 420 may be connectable to a Class 1 power conductor. Neutral input 422 may be connectable to a neutral conductor, and ground input 424 may be connectable to a ground conductor, which may be coupled to earth ground. First input 426 may be connectable to a first Class 1 conductor, and second input 428 may be connectable to a second Class 1 conductor. For example, upon installation of dimming driver 421 at light fixture location 208a or 208b, neutral input 422 may be connected to neutral conductor 112, ground input 424 may be connected to ground conductor 114, first input 426 may be connected to A-load conductor 116, and second input 428 may be connected to B-load conductor 118. In some embodiments, first input 426 may be coupled to first output 316 of dimming controller 306 via a first Class 1 conductor routed from a wall-mounted switch box to a light fixture location at which dimming driver 421 is located. Similarly, second input 428 may be coupled to second output 318 of dimming controller 306 via a second Class 1 conductor routed from the wall-mounted switch box to the light fixture location. Also, voltage input 420 may be electrically coupled to second input 428 (not shown in FIG. 4). In some embodiments, voltage input 420 may be coupled to second input 428 prior to installation of dimming driver 421 at a light fixture location.

Dimming driver 421 may also include a line filter 470, a switching power controller 475, a transformer T2, a dimming power supply 480, a dimming signal receiver 483, a lighting power supply 488, a lighting controller 491, and optical isolators 496 and 497. As described in more detail below, line filter 470 and switching power controller 475 may be galvanically isolated from dimming power supply 480, dimming signal receiver 483, lighting power supply 488, and lighting controller 491. Dimming power supply 480 and dimming signal receiver 483 may be galvanically isolated from line filter 470, switching power controller 475, lighting power supply 488, and lighting controller 491. And lighting power supply 488 and lighting controller 491 may be galvanically isolated from line filter 470, switching power controller 475, dimming power supply 480, and dimming signal receiver 483.

Line filter 470 may have a line voltage filter input 471, a neutral input 472, and a ground input 473. Line voltage filter input 471 may be coupled to voltage input 420, neutral input 472 may be coupled to neutral input 422, and ground input 473 may be coupled to ground input 424. Line filter 470 may also have a line voltage filter output 474a and a reference voltage output 474b. Line filter 470 may be used to prevent high frequency noise that may be generated by switching power controller 475 from coupling back onto an AC power line connected to voltage input 420, which may potentially interfere with other equipment sharing the same power. Line filter 470 may also provide a DC voltage to switching power controller 475. The DC voltage may be a function of the AC line voltage received at voltage input 420 and the load on the secondary side (S1 and S2) of transformer T2. For example, if the AC line voltage is about 120 volts, the output DC voltage may be about 169 volts. If the AC line voltage is, e.g., about 277 volts, the output DC voltage may be about 390 volts. Line filter 470 may be constructed from discrete parts to provide common and differential mode filtering, as is known in the art. Any suitable line filter may be used.

Switching power controller 475 may have a line voltage input 476a, a voltage reference 476b, a feedback input 477, a voltage bulk output 478, and a MOSFET output 479. Line voltage input 476a may be coupled to line voltage filter output 474a, and voltage reference 476b may be coupled to reference voltage output 474b. Switching power controller 475 may receive DC voltage from line filter 470 and apply an AC square wave with a varying pulse width to drive the primary winding P of transformer T2 via voltage bulk output 478 and MOSFET output 479. That is, voltage bulk output 478 and MOSFET output 479 may each be coupled to a primary winding P of transformer T2, which may be a high frequency ferrite core transformer. In some embodiments, a switching frequency of about 100 kHz may be used. Other switching frequencies may be used in other embodiments. Switching power controller 475 may be, e.g., an IRS2548D by International Rectifier, of El Segundo, Calif. Any suitable switching power controller may be used.

Transformer T2 may have a first secondary winding S1 and a second secondary winding S2. Transformer T2 may convert the AC voltage received from switching power controller 475 to one or more lower AC voltages in a range of, e.g., about 12 to 20 volts at the first secondary winding S1 and in a range of, e.g., about 25 to 40 volts at the second secondary winding S2. Transformer T2 may electrically isolate voltage input 420, line filter 470, and switching power controller 475 from the other components of dimming driver 421. That is, transformer T2 may prevent AC voltage received at voltage input 420 from finding a conduction path to the other components of dimming driver 421.

Dimming power supply 480 may have a dimming power A input 481a, a dimming power B input 481b, a dimming voltage output 482a, and a dimming voltage reference 482b. Dimming power A input 481a and dimming power B input 481b may be coupled to the first secondary winding S1 of transformer T2. The voltage received from the first secondary winding S1 may, in some embodiments, be about 12 to 20 volts AC. Dimming power supply 480 may convert an AC voltage received from transformer T2 into a regulated DC voltage provided at dimming voltage output 482a. The DC voltage provided may, in some embodiments, be about 16 volts. The dimming reference voltage provided at dimming voltage reference 482b may, in some embodiments, be about zero volts. Dimming power supply 480 may be, e.g., an LP2985 by Texas Instruments Incorporated, of Dallas, Tex. Any suitable dimming power supply may be used.

Dimming signal receiver 483 may have a dimming voltage input 484a, a dimming voltage reference 484b, a dimming control output 485, a 0-10V+ input 486, and a 0-10V− input 487. Dimming voltage input 484a may be coupled to dimming voltage output 482a of dimming power supply 480, and dimming voltage reference 484b may be coupled to dimming voltage reference 482b of dimming power supply 480. The 0-10V+ input 486 may be coupled to first input 426, and the 0-10V− input 487 may be coupled to second input 428 of dimming driver 421. Second input 428 may be coupled to provide a reference voltage for dimming power supply 480 and dimming signal receiver 483.

Dimming signal receiver 483 may be operative to receive a dimming signal referenced to an AC voltage and indicative of a dimming light level (e.g., from 0% light output to 100% light output in some embodiments) at the 0-10V+ input 486 and the 0-10V− input 487. The dimming signal may be received via first input 426 and second input 428 and may have been output from a dimming controller, such as, e.g., dimming controller 206 or 306 and, more particularly, from a dimming signal generator such as, e.g., dimming signal generator 363. Dimming signal receiver 483 may be operative to provide at dimming control output 485a dimming control signal indicative of a dimming light level. That is, a dimming control signal based on the dimming signal received at the 0-10V+ input 486 and the 0-10V− input 487 may be provided at dimming control output 485. In some embodiments, dimming driver 421 may respond to receiving the 0-10 volt control voltage in accordance with a linear or logarithmic dimming curve or light output, as is known in the art.

An optical isolator 496 may be coupled between dimming signal receiver 483 and lighting controller 491. That is, an input of optical isolator 496 may be coupled to dimming control output 485 of dimming signal receiver 483 and an output of optical isolator 496 may be coupled to lighting controller 491. Optical isolator 496 may provide galvanic isolation between dimming signal receiver 483 and lighting controller 491. Optical isolator 496 may be, e.g., an LTV-817 by Lite-On Technology Corporation, of Taipei, Taiwan. Any suitable optical isolator may be used.

Lighting power supply 488 may have a lighting power A input 489a, a lighting power B input 489b, a lighting voltage output 490a, and a lighting voltage reference 490b. Lighting power A input 489a and lighting power B input 489b may be coupled to second secondary winding S2 of transformer T2. The voltage received from the second secondary winding S2 may, in some embodiments, be about 40 volts AC. Lighting power supply 488 may convert an AC voltage received from transformer T2 into a regulated DC voltage provided at lighting voltage output 490a. The DC voltage provided may, in some embodiments, be about 40 volts. The lighting reference voltage at lighting voltage reference 490b may, in some embodiments, be about zero volts. Any suitable lighting power supply may be used.

Lighting controller 491 may have a lighting voltage input 492a, a lighting voltage reference 492b, a lighting control input 493, a lighting voltage+ output 494, and a lighting voltage− output 495. Lighting voltage input 492a may be coupled to lighting voltage output 490a of lighting power supply 488, and lighting voltage reference 492b may be coupled to lighting voltage reference 490b of lighting power supply 488. Lighting voltage+ output 494 may be coupled to lighting device voltage+ output 498 of dimming driver 421, and lighting voltage− output 495 may be coupled to a lighting device voltage− output 499 of dimming driver 421. Lighting device voltage− output 499 may be coupled to provide a reference voltage for lighting power supply 488 and lighting controller 491.

Lighting control input 493 may be coupled to dimming control output 485 of dimming signal receiver 483 via optical isolator 496. That is, lighting control input 493 may be coupled to the output of optical isolator 496 to optically receive a dimming control signal from dimming control output 485 of dimming signal receiver 483. The dimming control signal received at lighting control input 493 may be the absolute light level to which lighting controller 491 may set outputs 494 and 495. For an LED bank, e.g., this may be done by limiting the amount of current flowing to the LED bank. The amount of current may be limited by providing feedback through optical isolator 497 to switching power controller 475, which may reduce power.

Optical isolator 497 may be coupled between feedback input 477 of switching power controller 475 and lighting voltage output 490a of lighting power supply 488. That is, optical isolator 497 may have an output coupled to feedback input 477 of switching power controller 475, and an input coupled to a node between lighting voltage output 490a and lighting voltage input 492a. Optical isolator 497 may provide galvanically isolated feedback from lighting voltage output 490a to switching power controller 475. This may allow switching power controller 475 to adjust its pulse width in response to changes in the secondary load. Optical isolator 497 may be the same part or type as optical isolator 496 or, alternatively, may be any suitable part or type of optical isolator.

Note that none of switching power controller 475, dimming signal receiver 483, and lighting controller 491 shares a common reference voltage.

Figure 5:
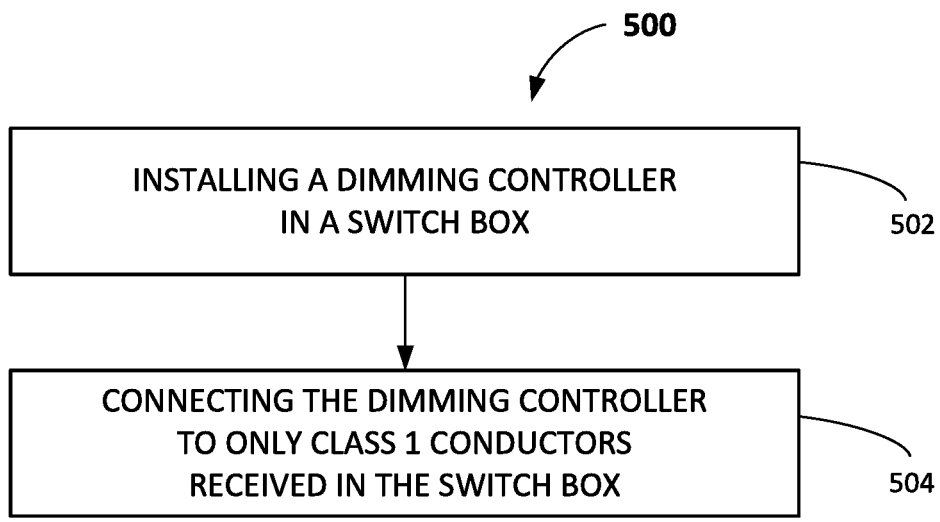
FIG. 5 illustrates a flowchart of a method of replacing a bi-level lighting system with a dimmable lighting system according to embodiments.

FIG. 5 illustrates a method 500 of replacing a bi-level lighting system with a dimmable lighting system. In some embodiments, the bi-level lighting system may be similar or identical to bi-level lighting system 100. In some embodiments, the dimmable lighting system may be dimmable lighting system 200 of FIG. 2. The dimmable lighting system may provide a dimming range of, e.g., 20% to 100%, 15% to 100%, 10% to 100%, or 0% to 100%. That is, dimming light levels may range from maximum light output (i.e., 100%) down to, e.g., 20% light output, 15% light output, 10% light output, or 0% light output (i.e., lights off), respectively. Other embodiments may have other dimming ranges.

At process block 502, method 500 may include installing a dimming controller in a switch box. In some embodiments, the switch box may be a wall-mounted dual-gang switch box previously housing a bi-level control unit (including, e.g., a pair of switches and relays as described in connection with FIG. 1). The dimming controller may have a voltage input, a first output, and a second output, and may be operative to output a 0-10 volt DC dimming signal indicative of a dimming light level. The dimming signal may be referenced to an AC voltage received at the voltage input. That is, instead of a typical ground reference, the dimming controller may use the AC voltage received at the voltage input as the reference voltage for the dimming signal. This may eliminate the need for an additional signal wire from the dimming controller. The dimming controller may be, e.g., dimming controller 206 or 306 of FIG. 2 or 3, respectively.

At process block 504, method 500 may include connecting the dimming controller to only Class 1 conductors received in the switch box. In some embodiments, the voltage input of the dimming controller may be connected to a Class 1 power conductor received in the switch box and configured to provide an AC voltage from a utility power source to the switch box. The first output of the dimming controller may be connected to a first Class 1 conductor received in the switch box, and the second output of the dimming controller may be connected to a second Class 1 conductor received in the switch box. The Class 1 power conductor, the first Class 1 conductor, and the second Class 1 conductor may each have been previously connected to the bi-level control unit of the bi-level lighting system being replaced. For example, the Class 1 power conductor may be power conductor 110, the first Class 1 conductor may be A-load conductor 116, and the second Class 1 conductor may be B-load conductor 118 of FIGS. 1 and 2.

In some embodiments, method 500 may also include one or more of the following: removing the bi-level control unit of the bi-level lighting system being replaced from the switch box prior to the installing of the dimming controller, and/or connecting a ground input of the dimming controller to an earth ground conductor received in the switch box. For example, the bi-level control unit may be bi-level control unit 106 of FIG. 1, and the earth ground conductor may be ground conductor 114

Method 500 may also include, in some embodiments, installing a dimming driver at a light fixture location, the dimming driver operative to receive the 0-10 volt DC dimming signal indicative of a dimming light level. The dimming driver may also be operative to provide power indicative of the dimming light level to a dimmable lighting device. Method 500 may further include connecting the dimming driver to only the Class 1 conductors received at the switch box and routed to the light fixture location.

Figure 6:
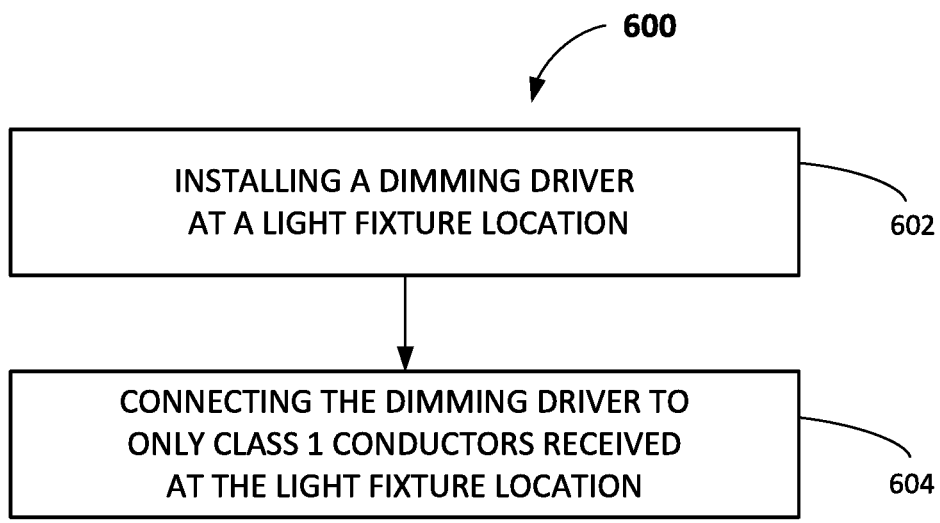
FIG. 6 illustrates a flowchart of another method of replacing a bi-level lighting system with a dimmable lighting system according to embodiments.

FIG. 6 illustrates a second method 600 of replacing a bi-level lighting system with a dimmable lighting system. In some embodiments, the bi-level lighting system may be similar or identical to bi-level lighting system 100. In some embodiments, the dimmable lighting system may be dimmable lighting system 200 of FIG. 2. The dimmable lighting system may provide a dimming range of, e.g., 20% to 100%, 15% to 100%, 10% to 100%, or 0% to 100%. That is, dimming light levels may range from maximum light output (i.e., 100%) down to, e.g., 20% light output, 15% light output, 10% light output, or 0% light output (i.e., lights off), respectively. Other embodiments may have other dimming ranges.

At process block 602, method 600 may include installing a dimming driver at a light fixture location. In some embodiments, the light fixture location may have had non-dimmable lighting mounted or attached thereat, which may be replaced with one or more suitable dimmable lighting devices. The dimming driver may have a voltage input, a first input, and a second input, wherein the second input may be coupled to the voltage input. The dimming driver may be operative to receive a 0-10 volt DC dimming signal indicative of a dimming light level, wherein the dimming signal may be referenced to an AC voltage, wherein the AC voltage may be received at the voltage input. The dimming driver may also be operative to provide power indicative of the dimming light level to a dimmable lighting device. The dimming driver may be, e.g., dimming driver 221a or 221b of FIG. 2, or dimming driver 421 of FIG. 4.

At process block 604, method 600 may include connecting the dimming driver to only Class 1 conductors received at the light fixture location. In some embodiments, the first input of the dimming driver may be connected to a first Class 1 conductor received at the light fixture location, and the second input of the dimming driver may be connected to a second Class 1 conductor received at the light fixture location. The first Class 1 conductor and the second Class 1 conductor may each have been previously connected to a light fixture having non-dimmable lighting. For example, the first Class 1 conductor may be A-load conductor 116, and the second Class 1 conductor may be B-load conductor 118 of FIGS. 1 and 2.

In some embodiments, method 600 may also include connecting a ground input of the dimming driver to an earth ground conductor received at the light fixture location, and connecting a neutral input of the dimming driver to a neutral conductor received at the light fixture location. For example, the neutral conductor may be neutral conductor 112 and the earth ground conductor may be ground conductor 114 of FIGS. 1 and 2.

Method 600 may also include, in some embodiments, installing a dimming controller in a switch box, the dimming controller operative to output the 0-10 volt DC dimming signal indicative of a dimming light level. Method 600 may further include connecting the dimming controller to only the Class 1 conductors routed from the light fixture location to the switch box.

Note that some embodiments, or portions thereof, may be provided as a computer program product or software that may include a machine-readable medium having non-transient instructions stored thereon, which may be used to program, e.g., microcontroller 347 or other electronic device to perform a process in accordance with one or more embodiments.

Persons skilled in the art should readily appreciate that the invention described herein is susceptible of broad utility and application. Many embodiments and adaptations of the invention other than those described herein, as well as many variations, modifications, and equivalent arrangements, will be apparent from, or reasonably suggested by, the invention and the foregoing description thereof, without departing from the substance or scope of the invention. For example, although described in connection with dimmable LED lighting devices and the replacement of a bi-level lighting system, one or more embodiments of the invention may involve other types of dimmable lighting devices and/or installations of dimmable lighting systems that do not involve the replacement of an existing bi-level lighting system. For example, a dimmable lighting system of the invention may be installed in new construction using less wiring than conventional dimmable lighting systems. Accordingly, while the invention has been described herein in detail in relation to specific embodiments, it should be understood that this disclosure is only illustrative and presents examples of the invention and is made merely for purposes of providing a full and enabling disclosure of the invention. This disclosure is not intended to limit the invention to the particular apparatus, devices, assemblies, systems, or methods disclosed, but, to the contrary, the intention is to cover all modifications, equivalents, and alternatives falling within the scope of the invention.

What is claimed is:

1. A dimming controller comprising:
    a voltage input connectable to a Class 1 power conductor configured to provide an AC voltage;
    a first output connectable to a first Class 1 conductor;
    a second output connectable to a second Class 1 conductor; and
    a dimming signal generator having a voltage reference coupled to the second output and having a dimming signal output coupled to the first output, the dimming signal generator operative to provide a dimming signal indicative of a dimming light level at the dimming signal output, the dimming signal referenced to an AC voltage received at the voltage input.

2. The dimming controller of claim 1, further comprising a switching device coupled between the voltage input and the second output.

3. The dimming controller of claim 2, wherein the switching device comprises a relay.

4. The dimming controller of claim 2, wherein the switching device is operative to electrically couple the voltage input to the second output in response to a signal indicating that power should be provided to a lighting device.

5. The dimming controller of claim 2, wherein the dimming signal generator is galvanically isolated from the voltage input in response to the switching device electrically decoupling the voltage input from the second output.

6. The dimming controller of claim 1, wherein the voltage input is configured to receive an AC voltage ranging from 120 volts to 347 volts.

7. The dimming controller of claim 1, further comprising a ground input connectable to a ground conductor or a neutral conductor.

8. The dimming controller of claim 1, wherein:
    the dimming controller is configured to be received in a wall-mounted dual-gang switch box; and
    the Class 1 power conductor, the first Class 1 conductor, and the second Class 1 conductor are received in the switch box.

9. The dimming controller of claim 1, wherein the dimming signal generator is operative to output a 0-10 volt DC dimming signal referenced to the AC voltage received at the voltage input.

10. The dimming controller of claim 1, further comprising:
    a switching device coupled between the voltage input and the second output;
    a power supply controller coupled to the voltage input;
    a transformer having a primary winding coupled to an output of the power supply controller; and
    a low voltage power supply having an input and an output, the input coupled to a secondary winding of the transformer and the output coupled to the dimming signal generator, the low voltage power supply galvanically isolated from the power supply controller in response to the switching device electrically decoupling the voltage input from the second output.

11. The dimming controller of claim 1, further comprising:
    a switching device coupled between the voltage input and the second output;
    a microcontroller coupled to the dimming signal generator, the microcontroller galvanically isolated from the voltage input in response to the switching device electrically decoupling the voltage input from the second output; and
    a relay driver coupled to the microcontroller and to the switching device, the relay driver operative to cause the switching device to electrically couple the voltage input to the second output in response to a signal received from the microcontroller; wherein:
    the microcontroller is operative to cause the dimming signal generator to output a dimming signal indicative of a predetermined dimming light level.

12. The dimming controller of claim 11, wherein the microcontroller is operative to receive signals from an occupancy sensor, a light sensor, or a user interface.

13. The dimming controller of claim 1, further comprising a user interface coupled to the dimming signal generator and operative to receive inputs indicating an on/off state of lighting, a dimming light level, or both.

14. An occupancy sensor or a light sensor comprising the dimming controller of claim 1.

15. A dimmable lighting system comprising:
    the dimming controller of claim 1 located in a wall-mounted switch box; and
    a dimming driver operative to drive a dimmable lighting device, the dimming driver located at a light fixture location and comprising:
        a first input coupled to the first output of the dimming controller via a first Class 1 conductor routed from the wall-mounted switch box to the light fixture location;

a second input coupled to the second output of the dimming controller via a second Class 1 conductor routed from the wall-mounted switch box to the light fixture location; and a voltage input coupled to the second input.

16. The dimmable lighting system of claim 15 wherein the dimming driver further comprises:

a neutral input coupled to a neutral conductor; and a ground input coupled to a ground conductor.

17. The dimmable lighting system of claim 15 further comprising a dimmable lighting device coupled to the dimming driver.

18. The dimmable lighting system of claim 15 wherein the dimmable lighting system provides a dimming range of 20% to 100%, 15% to 100%, 10% to 100%, or 0% to 100%.

19. A dimming controller comprising a voltage input, a first output, and a second output, wherein the dimming controller is operative to provide a dimming signal indicative of a dimming light level at the first output and to provide a voltage reference at the second output, the dimming signal referenced to an AC voltage received at the voltage input.

20. The dimming controller of claim 19, wherein the AC voltage received at the voltage input ranges from 120 volts to 347 volts.

21. The dimming controller of claim 19, further comprising a switching device coupled between the voltage input and the second output.

22. The dimming controller of claim 21, further comprising a dimming signal generator providing the voltage reference to the second output and providing the dimming signal output to the first output, wherein the dimming signal generator is galvanically isolated from the voltage input in response to the switching device electrically decoupling the voltage input from the second output.

23. The dimming controller of claim 19, further comprising a user interface operative to receive inputs indicating an on/off state of lighting, a dimming light level, or both.

24. An occupancy sensor or a light sensor comprising the dimming controller of claim 19.

25. A dimmable lighting system comprising the dimming controller of claim 19, further comprising a first Class 1 conductor connected to the first output, a second Class 1 conductor connected to the second output, and a Class 1 power conductor connected to the voltage input.

26. The dimmable lighting system of claim 25, wherein the Class 1 power conductor provides an AC voltage ranging from 120 volts to 347 volts.

27. The dimmable lighting system of claim 25, further comprising a dimming driver operative to drive a dimmable lighting device, the dimming driver connected to the first Class 1 conductor and to the second Class 1 conductor and located at a light fixture location.

28. The dimmable lighting system of claim 27, further comprising a dimmable lighting device coupled to the dimming driver.

29. A dimmable lighting system comprising the dimming controller of claim 19, further comprising a dual-gang switch box, wherein the dimming controller is configured to be received in the dual-gang switch box.

30. The dimmable lighting system of claim 29, wherein the dual-gang switch box has a first Class 1 conductor, a second Class 1 conductor, and a Class 1 power conductor received therein.

* * * * *